US012253359B2

(12) United States Patent
Lee et al.

(10) Patent No.: US 12,253,359 B2
(45) Date of Patent: *Mar. 18, 2025

(54) LASER LEVEL

(71) Applicant: Stanley Black & Decker Inc., New Britain, CT (US)

(72) Inventors: Dustin M. Lee, Worthington, OH (US); Vincent Cook, Milford, CT (US); Michael T. Matteo, West Hartford, CT (US); Keith M. Lombardi, Avon, CT (US)

(73) Assignee: Stanley Black & Decker Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,276

(22) Filed: Oct. 24, 2023

(65) Prior Publication Data

US 2024/0060775 A1    Feb. 22, 2024

Related U.S. Application Data

(63) Continuation of application No. 17/874,380, filed on Jul. 27, 2022, now Pat. No. 11,859,975, which is a continuation of application No. 16/951,076, filed on Nov. 18, 2020, now Pat. No. 11,428,529, which is a continuation of application No. 16/589,411, filed on Oct. 1, 2019, now Pat. No. 10,871,372, which is a continuation of application No. 16/038,617, filed on Jul. 18, 2018, now Pat. No. 10,466,049, which is a continuation of application No. 14/936,047, filed on Nov. 9, 2015, now Pat. No. 10,066,939.

(60) Provisional application No. 62/240,720, filed on Oct. 13, 2015.

(51) Int. Cl.
*G01C 15/00*    (2006.01)

(52) U.S. Cl.
CPC ......... *G01C 15/002* (2013.01); *G01C 15/004* (2013.01)

(58) Field of Classification Search
CPC .......................... G01C 15/002; G01C 15/004
See application file for complete search history.

(56) References Cited

U.S. PATENT DOCUMENTS

| 6,068,821 | A | * | 5/2000 | VanDeGraaf | G12B 9/08 422/403 |
| 8,360,240 | B2 | * | 1/2013 | Kallabis | F16P 1/02 206/523 |
| D792,250 | S | * | 7/2017 | Hill | D10/66 |
| 10,066,939 | B2 | * | 9/2018 | Lee | G01C 15/004 |
| 10,352,736 | B2 | * | 7/2019 | Lukic | G01D 11/245 |
| 10,466,049 | B2 | * | 11/2019 | Lee | G01C 15/004 |
| 10,598,490 | B2 | * | 3/2020 | Yong | H01S 5/005 |
| 10,871,372 | B2 | * | 12/2020 | Lee | G01C 15/004 |
| 11,428,529 | B2 | * | 8/2022 | Lee | G01C 15/004 |

(Continued)

*Primary Examiner* — Yaritza Guadalupe-McCall
(74) *Attorney, Agent, or Firm* — Stephen R. Valancius

(57) ABSTRACT

A laser level including a control mechanism housing which houses a control mechanism, the control mechanism including at least a top surface and a bottom surface. A protective structure extends from the control mechanism housing configured to protect the control mechanism from impact and including an upper structure which extends from a top surface of the control mechanism housing and a lower structure which extends from a bottom surface of the control mechanism housing.

20 Claims, 19 Drawing Sheets

(56) References Cited

U.S. PATENT DOCUMENTS

| | | | |
|---|---|---|---|
| 11,859,975 B2* | 1/2024 | Lee | G01C 15/002 |
| 2007/0130785 A1* | 6/2007 | Bublitz | G01C 15/002 |
| | | | 33/290 |
| 2008/0043409 A1* | 2/2008 | Kallabis | G01C 15/004 |
| | | | 361/824 |
| 2017/0102238 A1* | 4/2017 | Lee | G01C 15/002 |
| 2018/0095174 A1* | 4/2018 | Mertz | G01S 17/36 |
| 2018/0321034 A1* | 11/2018 | Lee | G01C 15/002 |
| 2018/0321035 A1* | 11/2018 | Yong | G02B 27/14 |
| 2020/0033123 A1* | 1/2020 | Lee | G01C 15/002 |
| 2021/0072024 A1* | 3/2021 | Lee | G01C 15/002 |
| 2023/0020246 A1* | 1/2023 | Lee | G01C 15/004 |
| 2024/0060775 A1* | 2/2024 | Lee | G01C 15/004 |
| 2024/0183660 A1* | 6/2024 | Lee | G01C 15/004 |

* cited by examiner

LASER LEVEL

CROSS-REFERENCE TO RELATED APPLICATIONS

This application is a continuation of U.S. application Ser. No. 17/874,380 filed Jul. 27, 2022, which is a continuation of U.S. application Ser. No. 16/951,076 filed Nov. 18, 2020, which is a continuation of U.S. application Ser. No. 16/589, 411 filed Oct. 1, 2019, now U.S. Pat. No. 10,871,372 which is a continuation of U.S. application Ser. No. 16/038,617 filed Jul. 18, 2018, now U.S. Pat. No. 10,466,049 which is a continuation of U.S. application Ser. No. 14/936,047 filed Nov. 9, 2015, now U.S. Pat. No. 10,066,939 which claims the benefit of U.S. Provisional Application No. 62/240,720 filed on Oct. 13, 2015. The entire disclosure of the above applications is incorporated herein by reference.

FIELD OF THE INVENTION

The present invention relates to laser levels, particularly laser levels with a protective structure.

BACKGROUND

There are various existing laser levels. It is desired to provide a laser level with an improved protective structure.

SUMMARY

According to an exemplary embodiment, there is a laser level. The laser level includes a control mechanism housing which houses a control mechanism. A protective structure extends from the control mechanism housing and is configured to protect the control mechanism from impact.

The laser level may include a laser projector.

The control mechanism housing may include a top surface and wherein the laser projector is disposed at the top surface of the control mechanism housing.

The protective structure may include an upper structure which extends from the top surface of the control mechanism housing and extends beyond the laser projector.

The upper structure may extend both upwardly and outwardly from the top surface of the control mechanism housing.

The upper structure comprises an upper portion and a plurality of legs projecting from the control mechanism housing to the upper portion.

The control mechanism housing is cube shaped and the legs are disposed at corners of the top surface of the control mechanism housing.

A top surface of the upper structure may have a substantially square shape.

A top surface of the upper structure may be a closed shape.

The top surface of the upper structure may be open inside the closed shape.

The control mechanism housing may include a bottom surface opposite the top surface.

The protective structure may be made of a shock absorbing material.

The shock absorbing material may include at least one of rubber, foam and a shock absorbing plastic.

The control mechanism may include at least one laser.

The control mechanism may include a motor.

The control mechanism may include at least one lens.

The protective structure may further include a lower structure which extends from a bottom surface of the control mechanism housing.

The lower structure may extend both downwardly and outwardly from the top surface of the control mechanism housing.

The lower structure may include a lower portion and a plurality of lower legs projecting from the control mechanism housing to the lower portion.

The control mechanism housing may be cube shaped and the lower legs may be disposed at corners of the bottom surface of the control mechanism housing. A bottom surface of the lower structure may have a substantially square shape.

A bottom surface of the lower structure may be a closed shape.

The bottom surface of the lower structure may be open inside the closed shape.

The laser level may further include a battery to power the laser level.

The battery may be a removable battery pack.

The removable battery pack may be configured to power a variety of power tools and other products including such products as a drill, saw, sander, radio, infrared detector, lawn mower, string trimmer.

The laser level may be configured such that when placed on a flat surface, only the protective structure contacts the flat surface regardless of the orientation of the laser level.

The laser level may be configured such that it can be stably positioned on a flat surface in at least six orientations.

The at least six orientations may correspond to the six sides of the control mechanism housing.

There may be spaces between the control mechanism housing and the flanges.

The flanges may be usable as handles.

The upper protective structure may be made of rubber.

The legs of the upper protective structure may be made of rubber with a first durometer and the flanges of the upper protective structure may be made of a rubber with a second durometer, different than the first durometer.

The first durometer may be higher than the first durometer.

The second durometer may be lower than the first durometer.

According to another exemplary embodiment, the flanges of the upper protective structure may be made of rubber and the legs of the upper protective structure may be made or a material other than rubber. The material other than rubber may be metal. The metal may be spring steel.

The control mechanism housing may be made of a rigid material. The rigid material may be acrylonitrile butadiene styrene (ABS). The rigid material may be high impact polypropylene. The rigid material may be high impact polystyrene.

According to another exemplary embodiment, the flanges could form a generally elliptical shape and the control mechanism housing could be a generally elliptical cylinder.

According to another exemplary embodiment, the flanges of the protective structure can form a triangular shape and the control mechanism housing can be a generally triangular prism shape. In other embodiments, the flanges could form a shape with five sides, six sides, seven sides, eight sides or more and the control mechanism housing can be shaped with a corresponding structure. In other embodiments, the shape formed by the flanges and the control mechanism housing may not correspond. For example, the flanges may form a hexagon shape while the control mechanism housing is generally cube shaped.

DETAILED DESCRIPTION OF EXEMPLARY EMBODIMENTS

Figure 1:
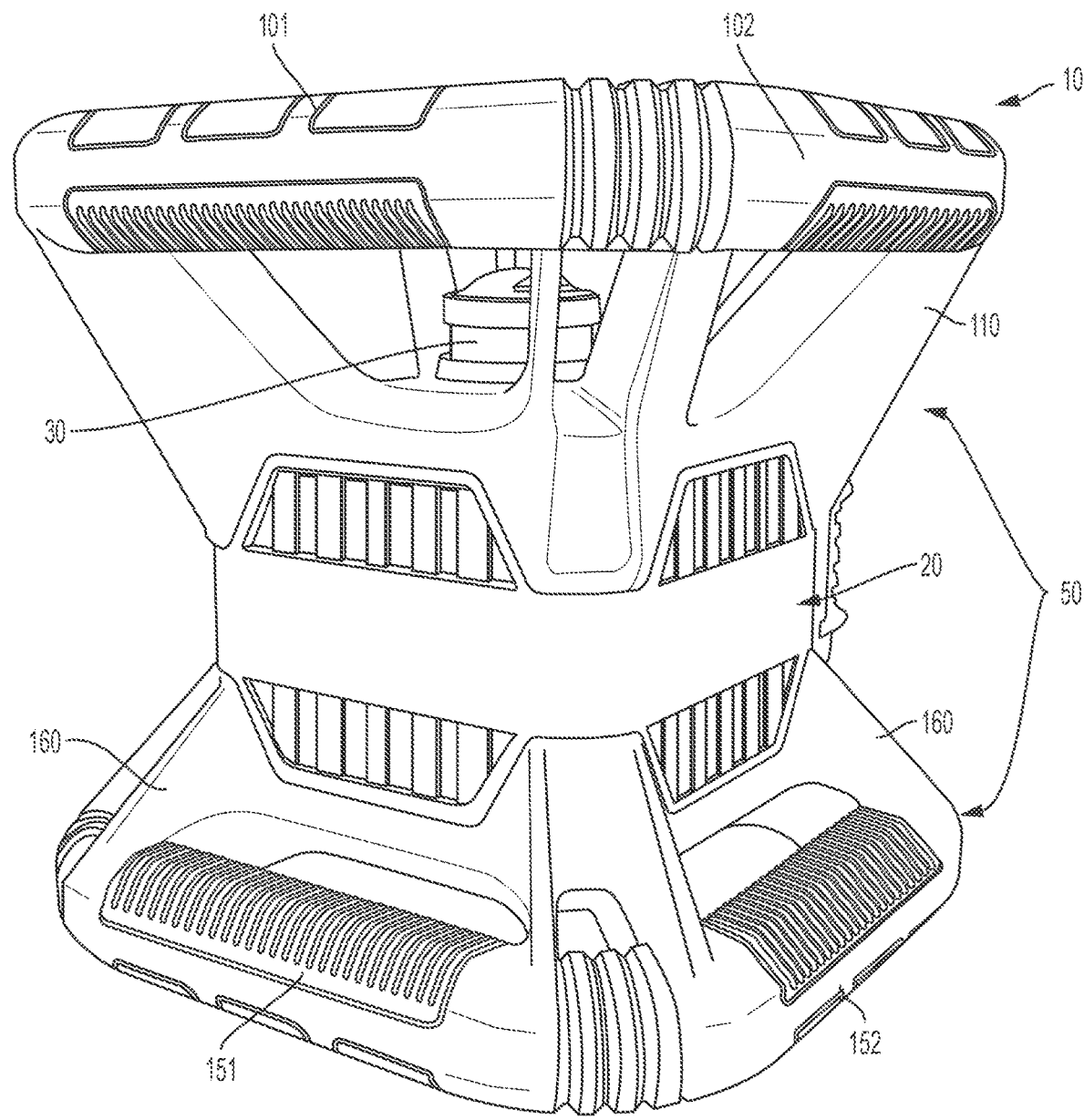
FIG. 1 illustrates a perspective view of an exemplary embodiment of a laser level.
Figure 2:
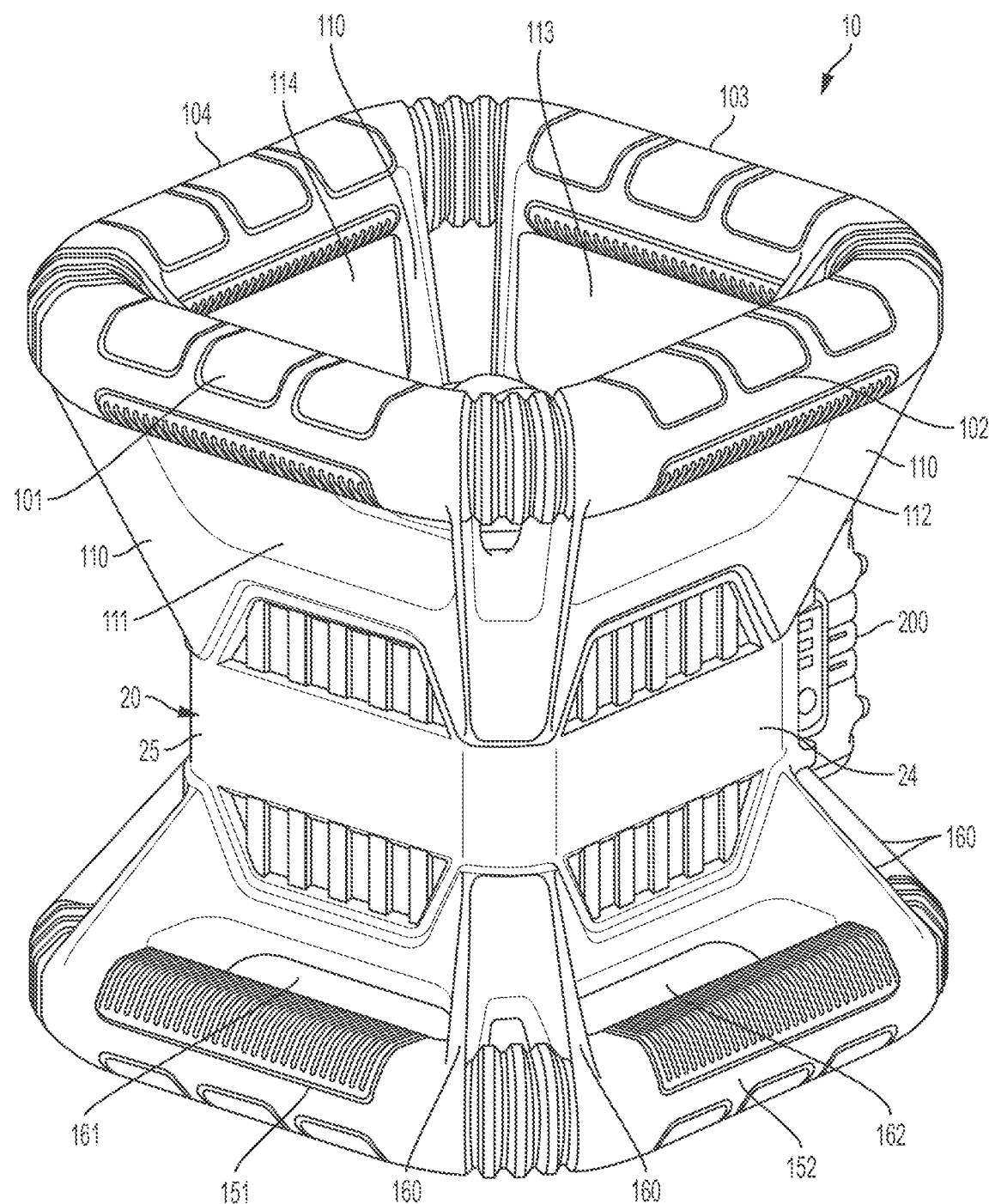
FIG. 2 is another perspective view of the exemplary embodiment of the laser level.

An exemplary embodiment according to the present application is shown in FIGS. 1-15. As shown in FIG. 1, the exemplary embodiment shows a rotary laser level 10. Rotary laser levels are known, for example, as shown in U.S. Pat. Nos. 4,854,703; 4,751,782; and 6,338,681, which are herein incorporated by reference in their entirety. Another rotary laser level is shown in US Patent Application Publication No. 2014/0203172, which is hereby incorporated by reference. The present application may also be applicable to other types of lasers such as U.S. Pat. Nos. 7,665,217; 7,076,880; 6,964,106; 7,481,002; 7,027,480; 8,640,350; 6,606,798; 7,013,571; 7,111,406; 7,296,360; and 7,571,546, which are herein incorporated by reference in their entirety.

FIGS. 1-8 illustrate the exemplary embodiment of the invention with the removable battery pack 200 attached. FIGS. 9-15 illustrate the exemplary embodiment of the invention without the battery pack.

As shown in the FIGS., there is a laser level 10. The laser level 10 includes a control mechanism housing 20. A laser projector 30 extends from the control mechanism housing and is configured to project a laser onto a surface. In the case of the rotary laser shown, the laser projection can be a 360 degree rotary projection. In other instances, the projector 30 may project one or more dot, one or more lines or a combination of lines and dots.

The control mechanism housing 20 includes a control mechanism which provides for projection of one or more laser beams or dots by the laser projector 30. The control mechanism may include, among other things; an LED or other light source; one or more lenses; one or more mirrors; a motor; and a microprocessor configured to control the laser level 10. The control mechanism may be a control mechanism shown in one of U.S. Pat. Nos. 4,854,703; 4,751,782; 6,338,681; US 2014/0203172; U.S. Pat. Nos. 7,665,217; 7,076,880; 6,964,106; 7,481,002; 7,027,480; 8,640,350; 6,606,798; 7,013,571; 7,111,406; 7,296,360; and 7,571,546 all of which have been incorporated by reference. For example, the control mechanism housing 20 may include the control mechanism housed in the upper casing part shown and described U.S. Pat. No. 4,854,703. Alternatively, the control mechanism housing 20 may include the control mechanism shown and described U.S. Pat. No. 8,640,350. In various embodiments, the projector 30 may be disposed at different places along the control mechanism housing 20. For example, the projector 30 may be on a front surface or may be internal to the control mechanism housing 20 with beams projecting out from the control mechanism housing 20.

Figure 11:
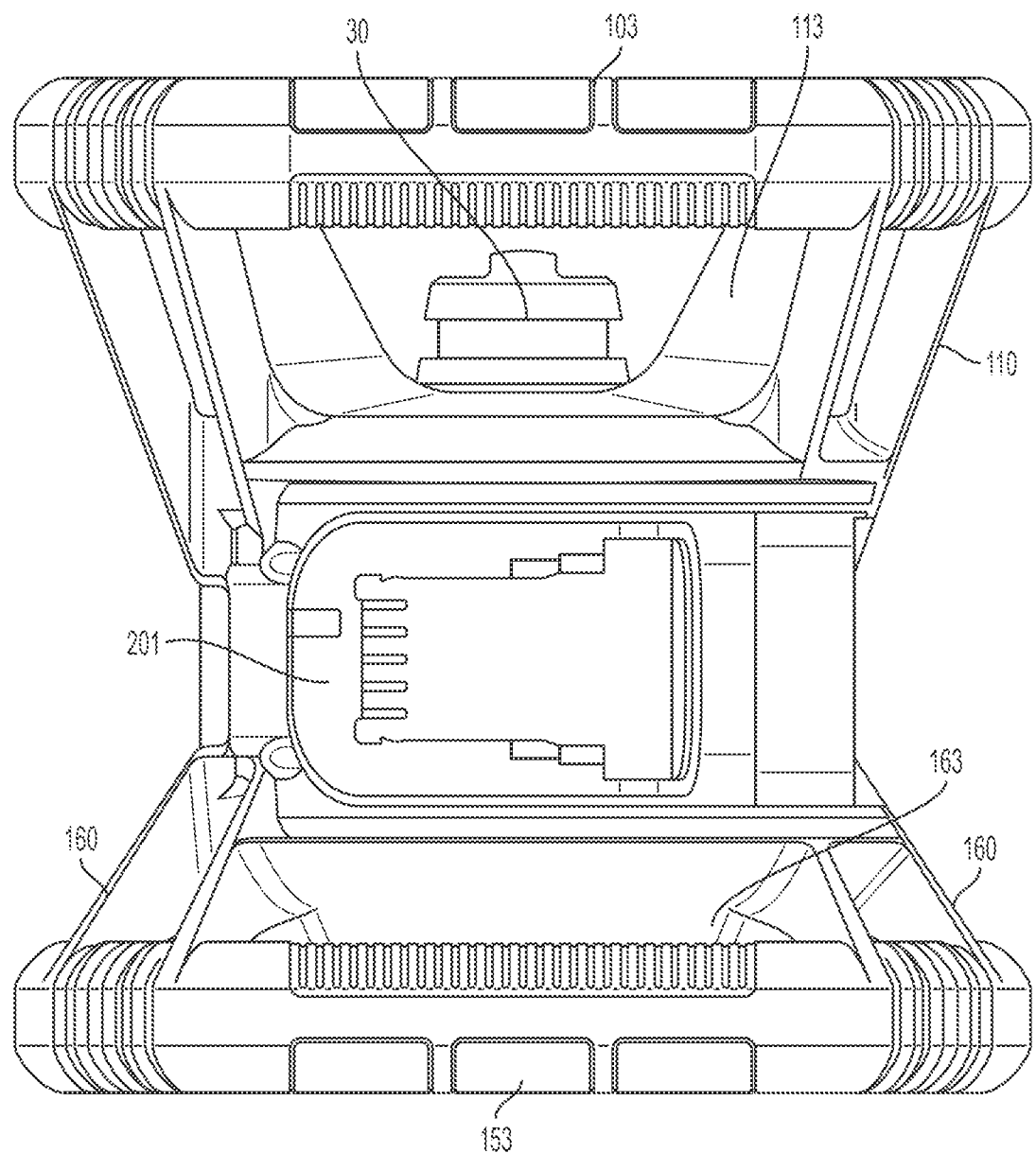
FIG. 11 is a back view of the exemplary embodiment of the laser level showing the battery pack connection section with the battery pack removed.
Figure 12:
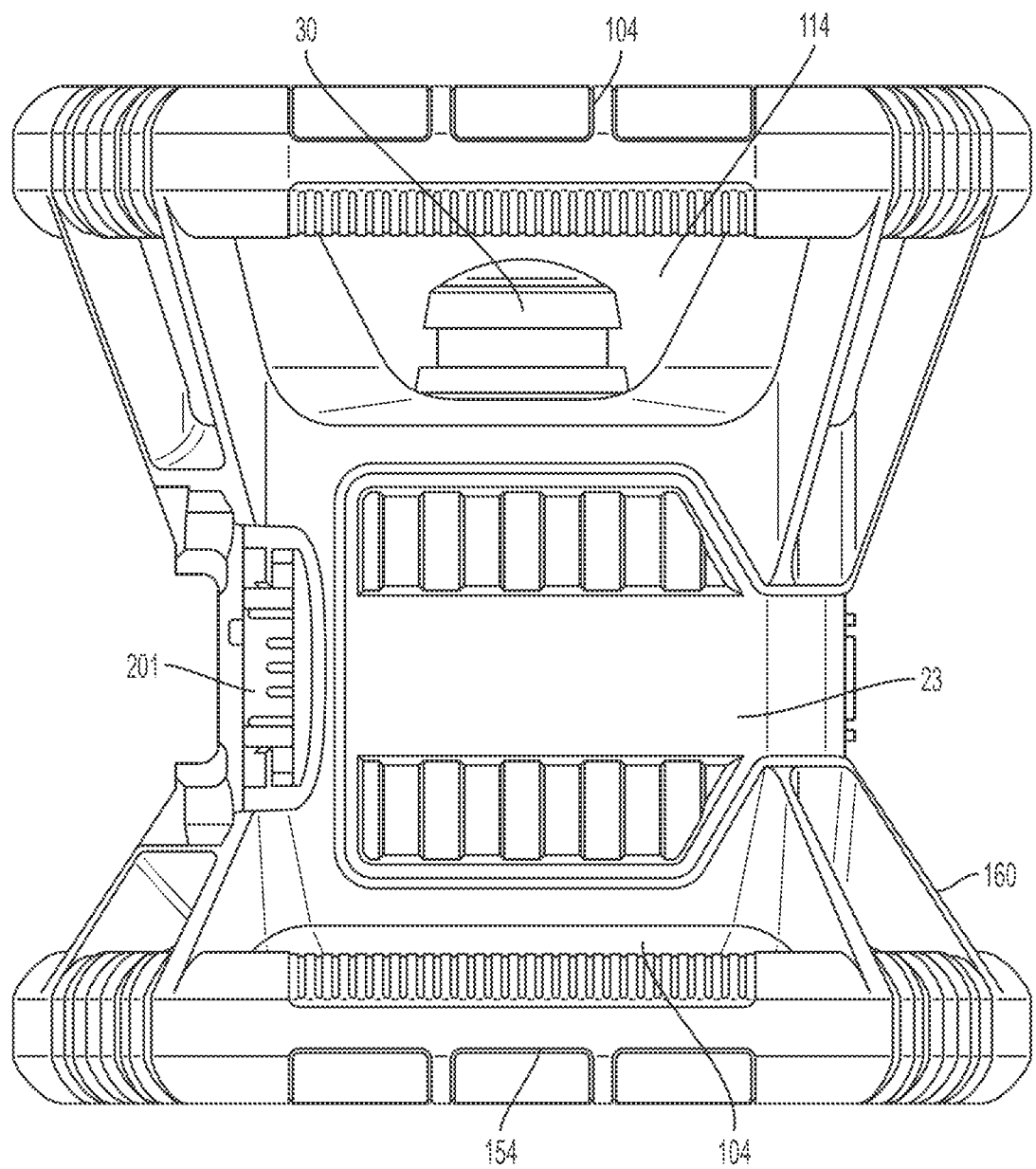
FIG. 12 is a left side view of the exemplary embodiment of the laser level with the battery pack removed.
Figure 13:
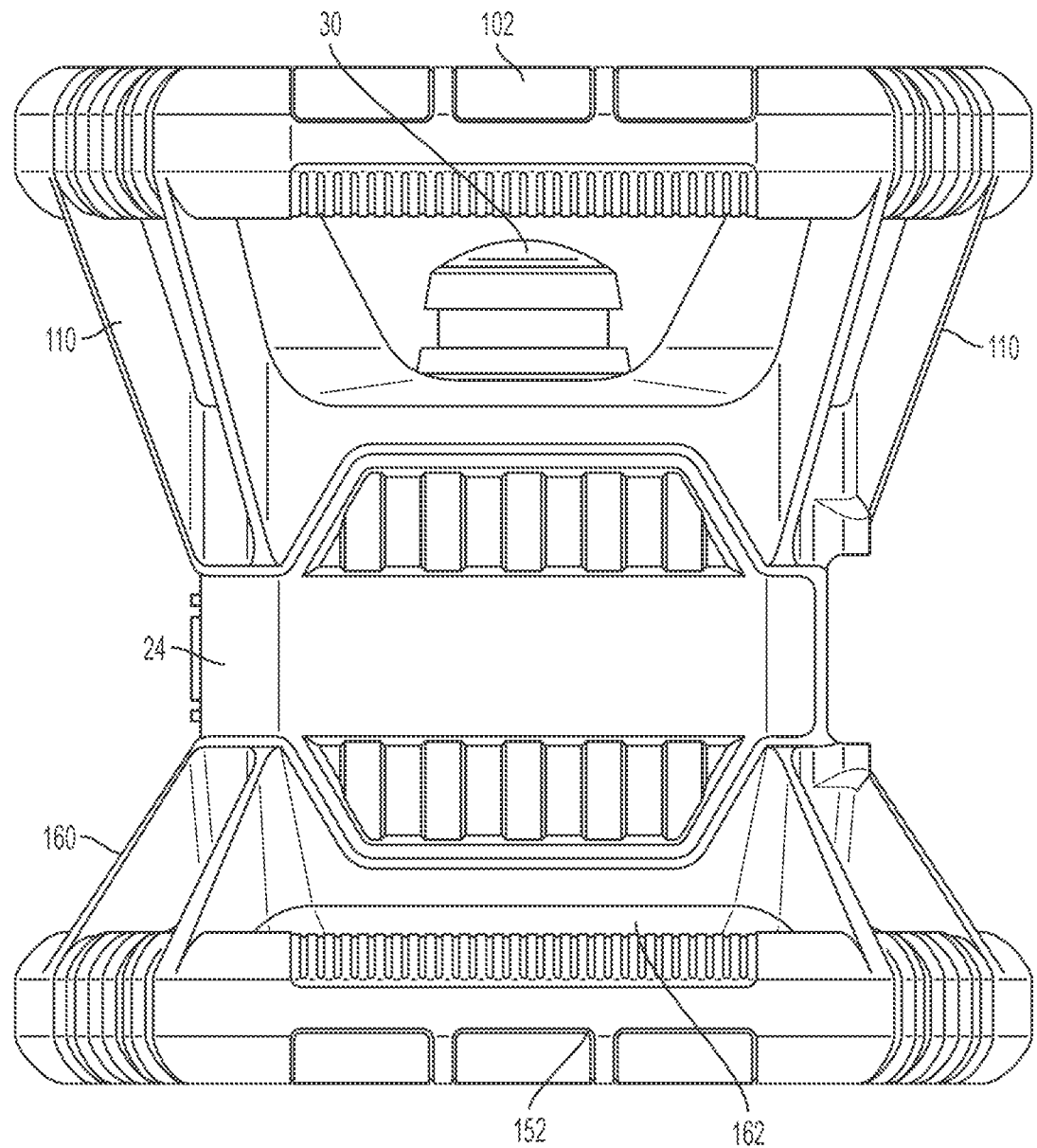
FIG. 13 is a right side view of the exemplary embodiment of the laser level with the battery pack removed.
Figure 14:
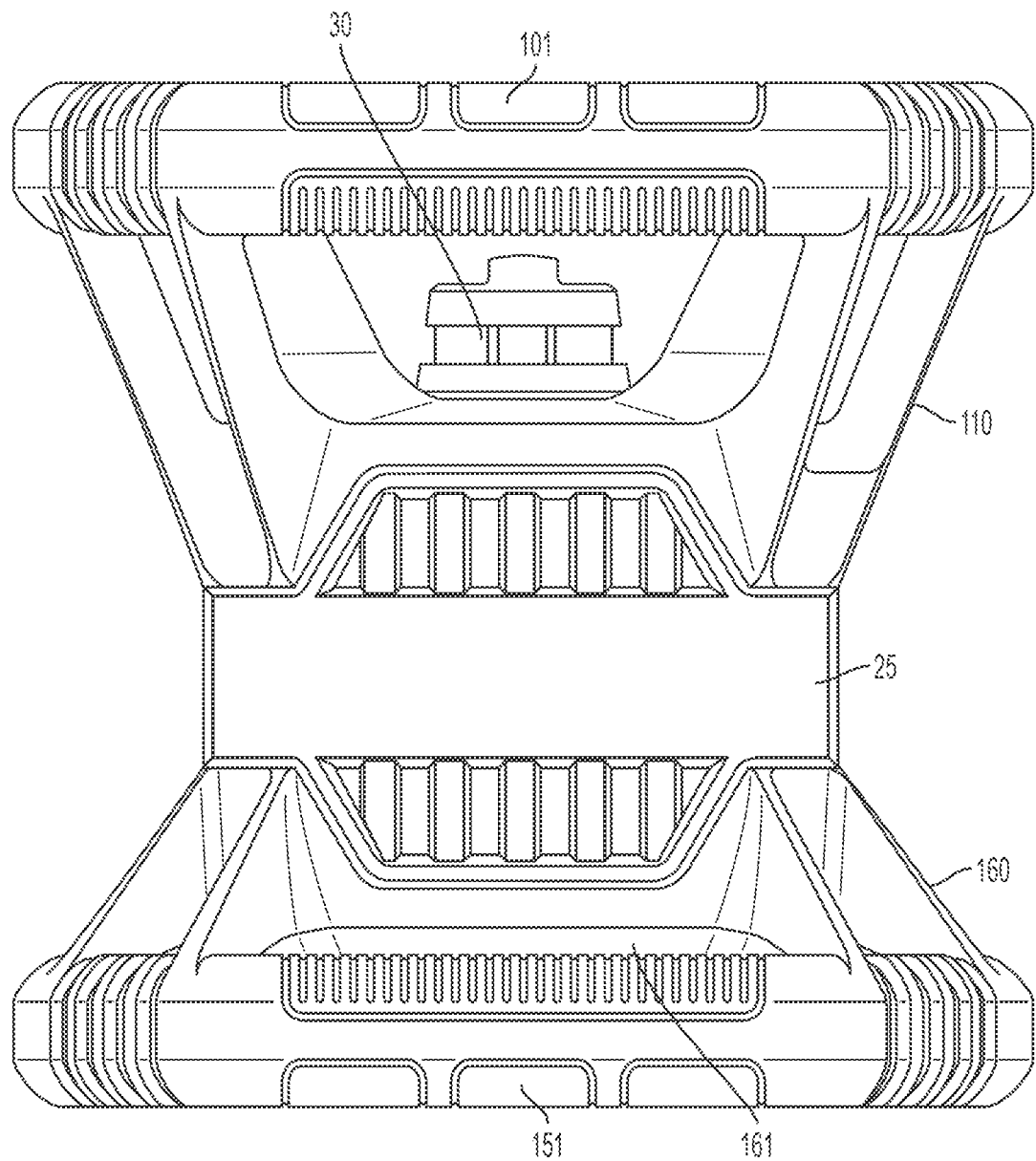
FIG. 14 is a front view of the exemplary embodiment of the laser level with the battery pack removed.
Figure 15:
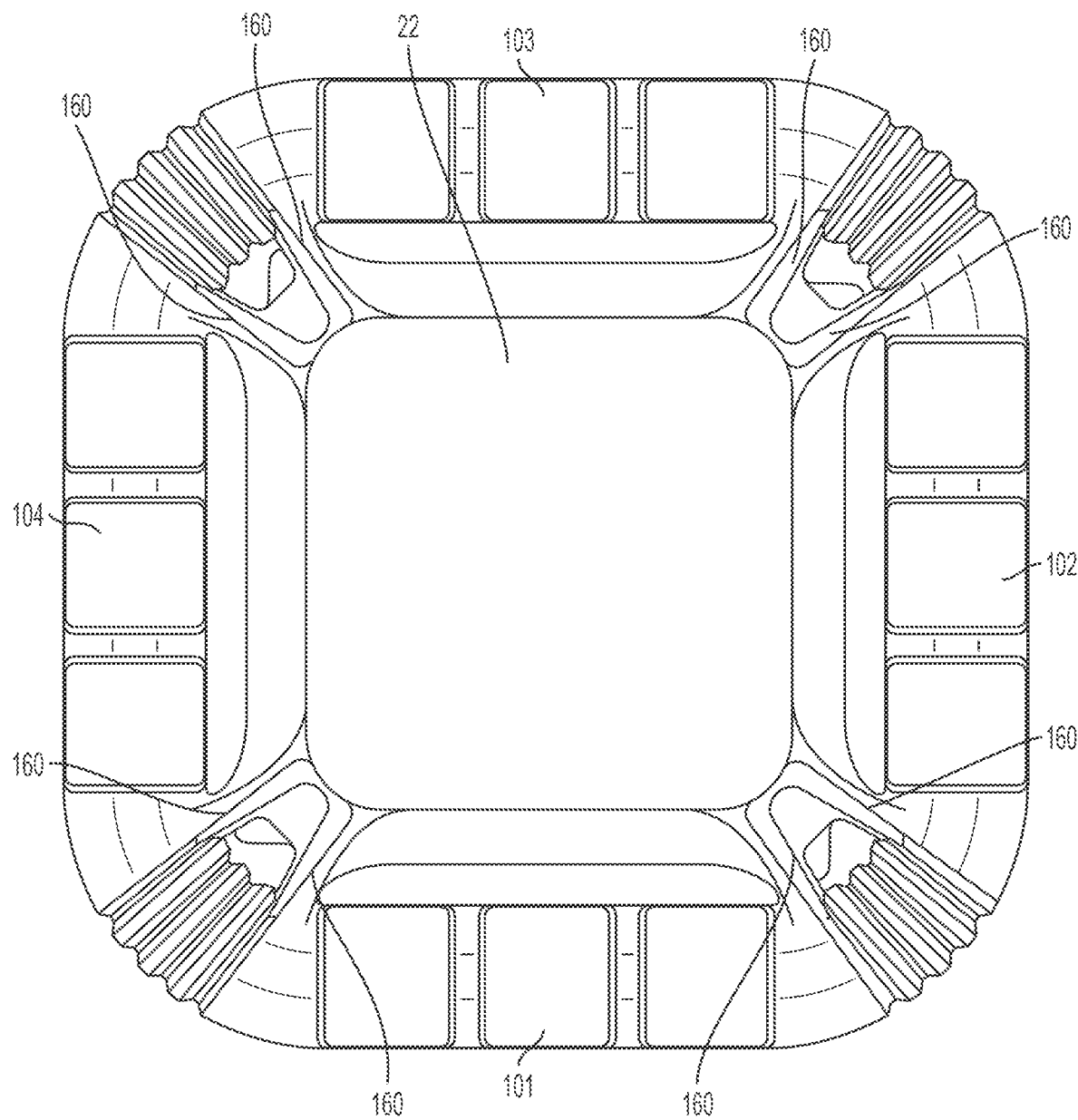
FIG. 15 is a bottom view of the exemplary embodiment of the laser level with the battery pack removed.

The control mechanism housing 20 has a substantially cubical shape. Accordingly, it has a top surface 21, a bottom surface 22, a left surface 23, a right surface 24, a front surface 25 and a back surface 26. The removable battery pack 200 is provided at the back surface. The removable battery pack 200 provides power for the laser level 10. The removable battery pack 200 may be a power tool battery pack such that it can be removed and mounted to a variety of power tools, outdoor power tools, cleaning tools, or other tools or products. As shown in FIG. 11, the laser level 10 includes a receptacle 201 for receiving the battery pack. The receptacle 201 can be one of many known designs for receiving a battery pack, including those for receiving a power tool battery pack. The control mechanism housing 20 may be made of a rigid material such as Acrylonitrile butadiene styrene (ABS), high impact polypropylene or high impact polystyrene (HIPS). In an embodiment, the control mechanism housing 20 may be made of a material having a Rockwell R hardness of 60 to 140. In other embodiments, the control mechanism housing may be made of a material having a Rockwell R hardness of 70 to 130, 80 to 120 or 80 to 114.

As shown in FIGS. 1-15, the laser level 10 has a protective structure 50. The protective structure 50 comprises an upper protective structure 100 and a lower protective structure 150. The upper protective structure 100 projects upwardly and outwardly from the top surface 21 and the lower protective structure 150 projects downwardly and outwardly from the bottom surface 22. The protective structure 50 in the exemplary embodiment is made of a shock absorbing material which can deform on impact at a controlled rate to dissipate the impact energy over a longer period. In the exemplary embodiment, the material of the protective structure 50 is designed to absorb shocks better than the material of the control mechanism housing 20. The shock absorbing material may be a material such as rubber, foam or a shock absorbing plastic. As can be appreciated, because the protective structure extends beyond the control mechanism housing 20, it protects the control mechanism housing 20 from impact when dropped from a variety of orientations. The flanges and the legs may be made of different durometers of rubber. For example, the rubber used for one or more legs may have a higher durometer than the rubber used for one or more flange. The rubber used for one or more flange may have a higher durometer than one or more legs.

In other exemplary embodiments, it is contemplated that the legs may be made from metal, such as spring steel, for example. In other exemplary embodiments, the protective structure may comprise a molded skeleton made from an impact resistant polymer that is overmolded in rubber or foamed rubber.

The upper protective structure 100 has four flanges 101, 102, 103, and 104. The flanges run roughly parallel to upper edges of the control mechanism housing 20. The flanges 101, 102, 103 and 104 are connected to the control mechanism housing 20 by upper legs 110. The lower protective structure 150 has four flanges 151, 152, 153, and 154. The flanges run roughly parallel to upper edges of the control mechanism housing 20. The flanges 151, 152, 153 and 154 are connected to the control mechanism housing 20 by lower legs 160.

In the exemplary embodiment, each upper corner includes a pair of legs 110 and each lower corner includes a pair of legs 160. In other embodiments, there may be additional or fewer legs. For example, each corner may include only one leg. The legs can also be dimensioned differently. For example, they could be made thinner or thicker than shown in the exemplary embodiment. In the exemplary embodiment, the legs 110, 160 are made of the same material as the flanges 101, 102, 103, 104, 151, 152, 153, and 154. In other embodiments, the legs 110, 160 may be made of a different material than the flanges. The legs 110, 160 may be the same or differ in various ways.

The upper protective structure 100 is configured so that the flanges 101, 102, 103 and 104 rise above the projector 30. In this way, the projector 30 is particularly protected against impact and the flanges 101, 102, 103 and 104 do not block lasers projecting from the projector 30. In the shown exemplary embodiment, the upper legs 110 are longer than the lower legs 160. This allows the upper legs 110 to provide sufficient clearance for the projector 30 so that the flanges 101, 102, 103 and 104 do not block any projection from the projector 30.

The legs creates spaces 111, 112, 113, 114, 161, 162, 163 and 163 between the control mechanism housing 20 and the flanges 101, 102, 103, 104, 151, 152, 153, and 154. The spaces allow for a decreased weight. Additionally, providing this spaced construction provides better impact protection. Also, as can be appreciated, the flanges 101, 102, 103, 104, 151, 152, 153, and 154 can serve as grab handles so the laser level tool 10 can be carried or re-positioned. Additionally, the flanges 101, 102, 103, 104, 151, 152, 153, and 154 have at least one set of aligned flats which allows the laser level 10 to be accurately re-positioned on its side to project a vertical beam. That is, when sitting upright, the laser level 10 projects a tool in a horizontal plane. The flats allow the laser level 10 to be placed on its sides so that a beam can be projected vertically. The flanges are also designed so as to not interfere with mounting of the tool on a tripod either vertically or horizontally. In the exemplary embodiment, the laser level 10 can be stably positions on a flat surface in at least six orientations. The at least six orientations correspond to the six sides of the cube-shaped control mechanism housing 20. That is, the laser level 10 can be positioned on a flat surface upright, upside-down or on any of its four sides. In any of these orientations, the laser level 10 will sit stably with only the protective structure 50 resting on the flat surface.

Figure 3:
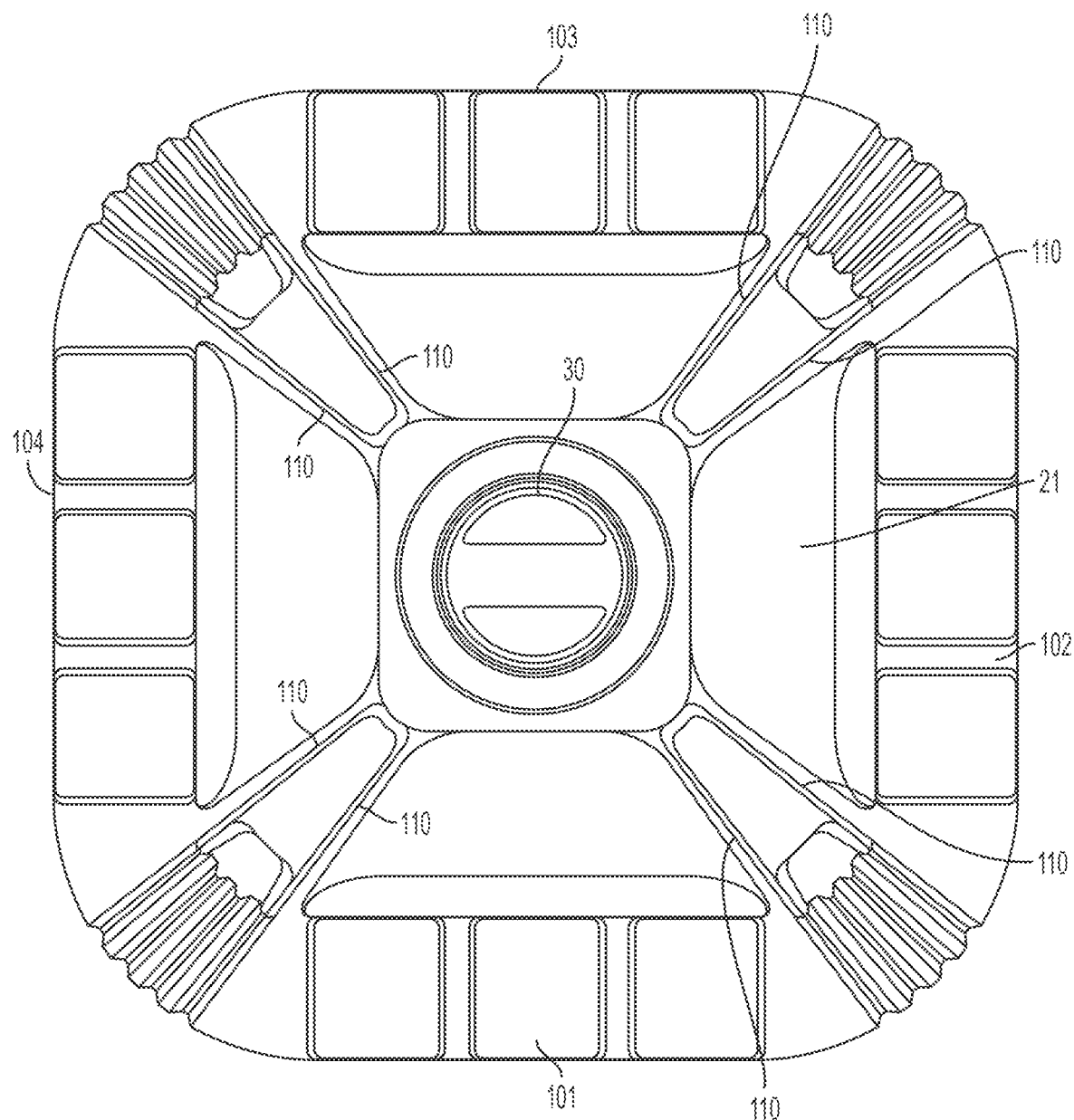
FIG. 3 is a top view of the exemplary embodiment of the laser level.
Figure 4:
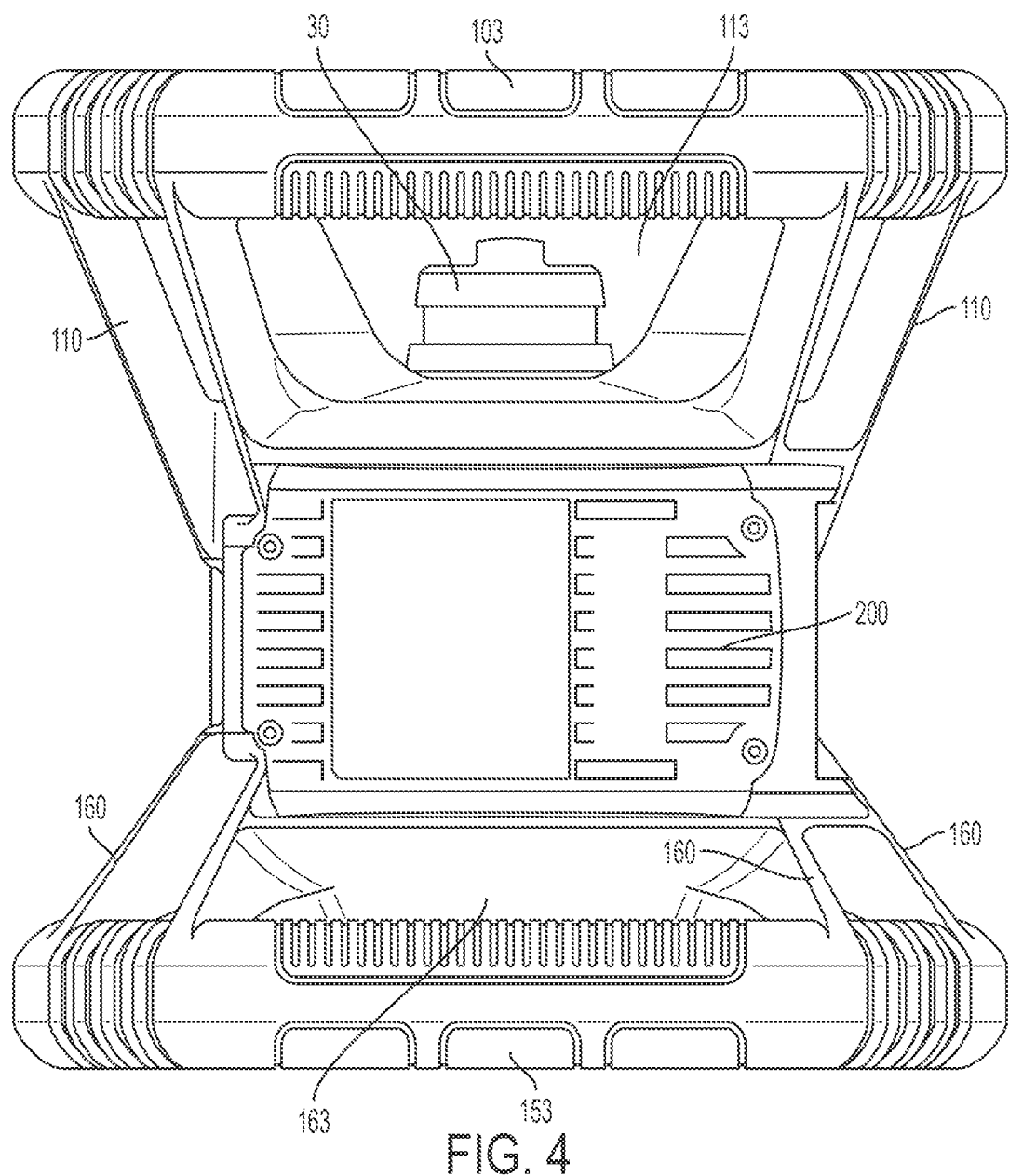
FIG. 4 is a back view of the exemplary embodiment of the laser level showing the attached battery pack.
Figure 5:
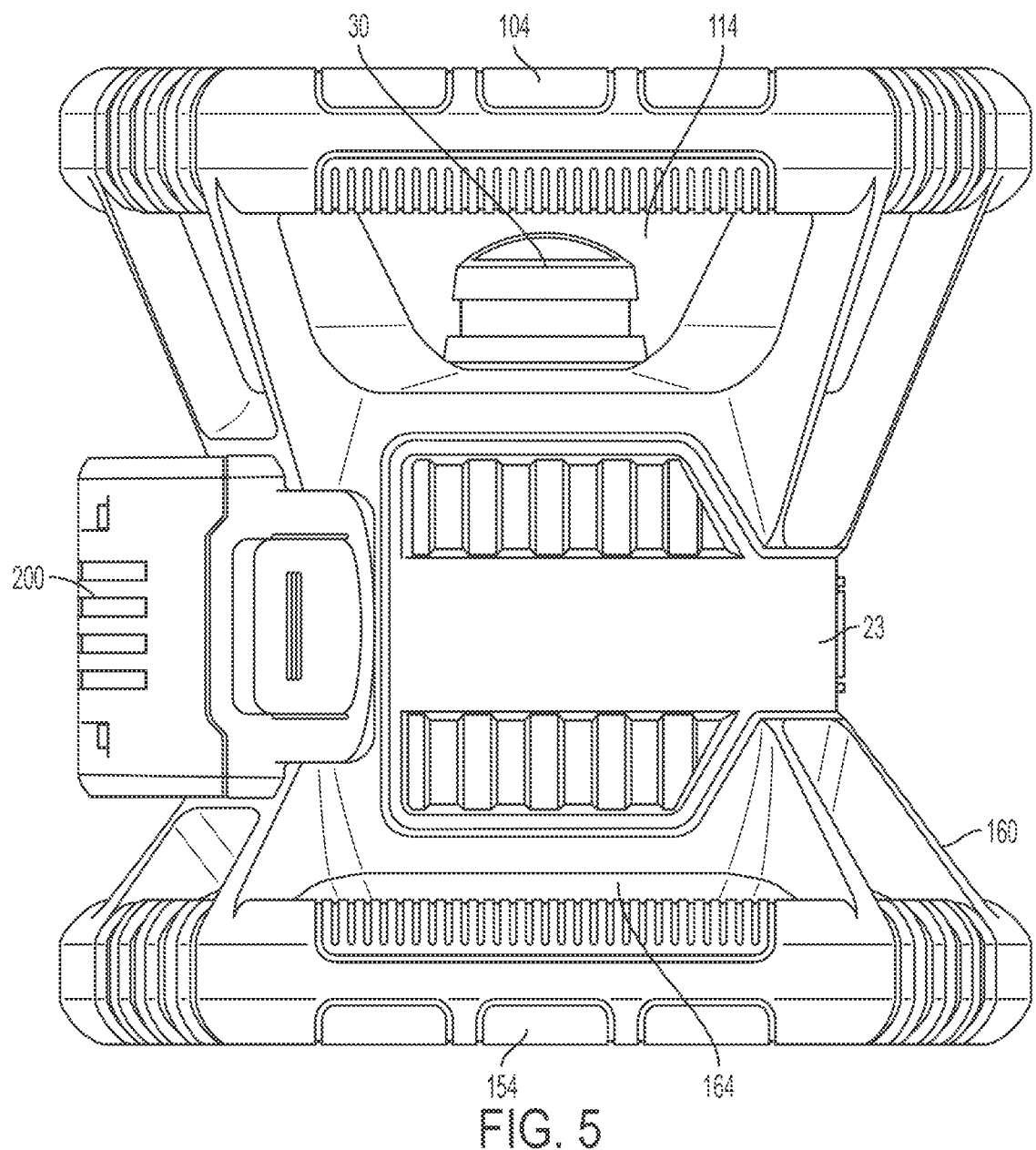
FIG. 5 is a left side view of the exemplary embodiment of the laser level.
Figure 6:
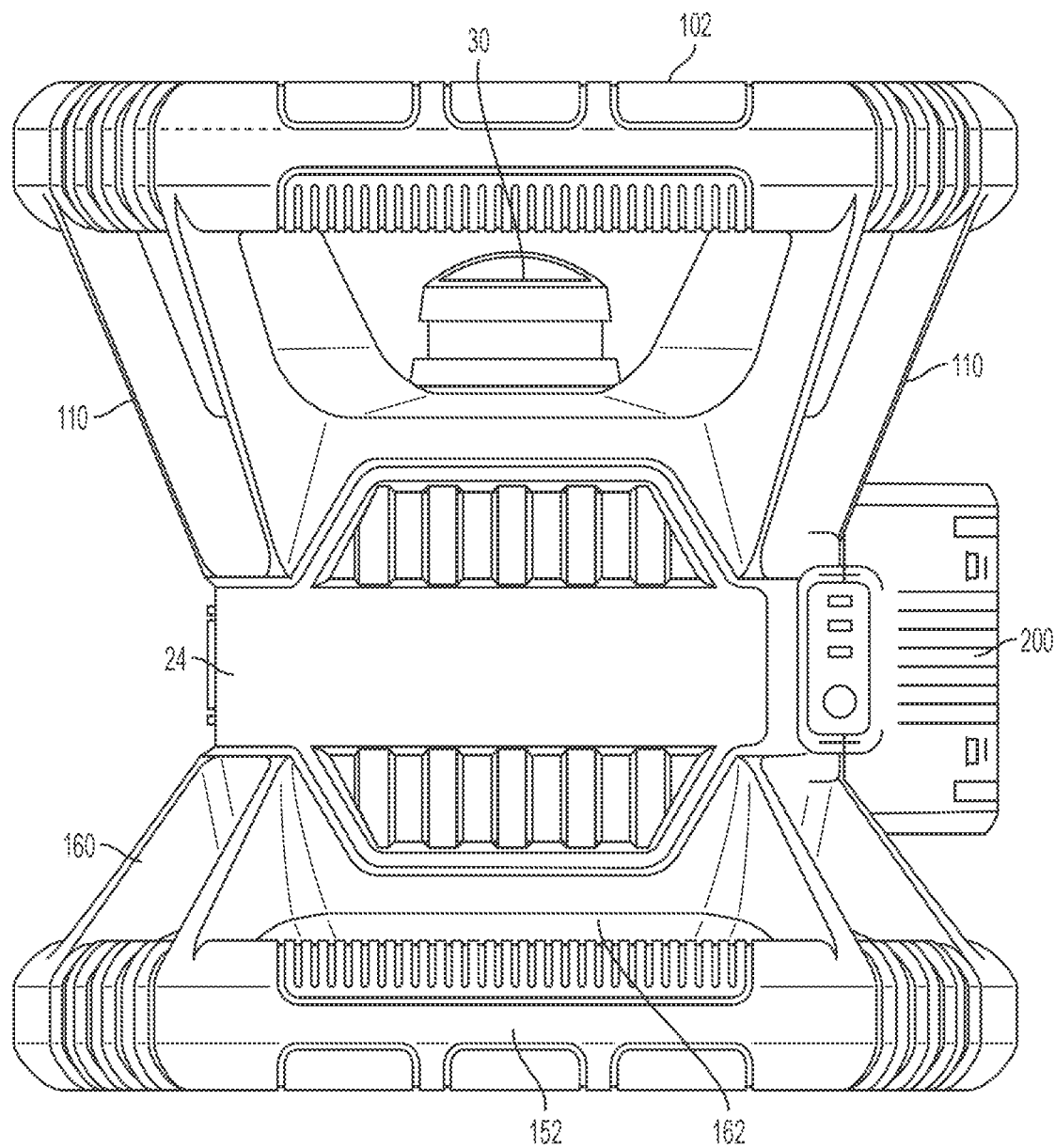
FIG. 6 is a right side view of the exemplary embodiment of the laser level.
Figure 7:
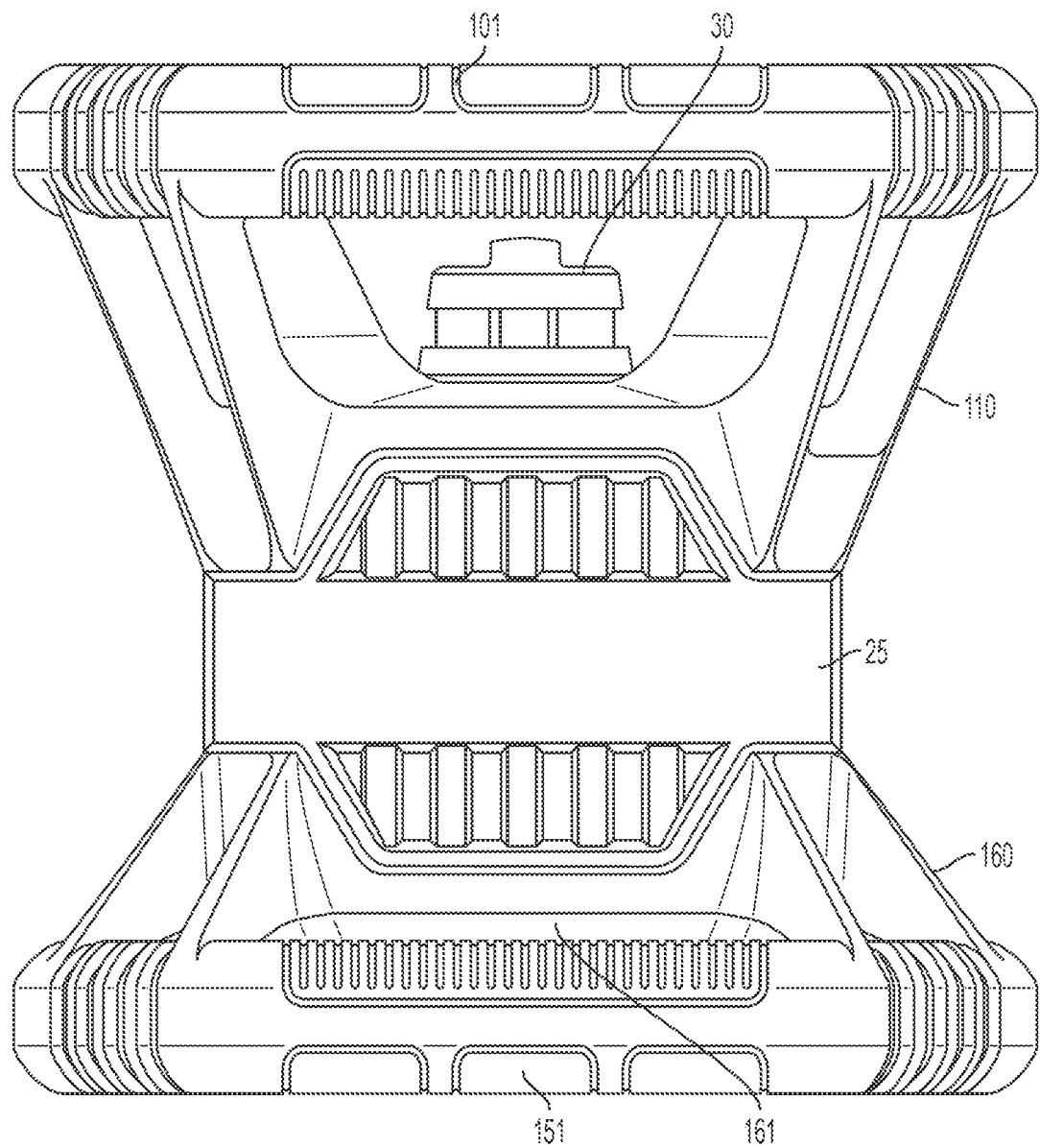
FIG. 7 is a front view of the exemplary embodiment of the laser level.
Figure 8:
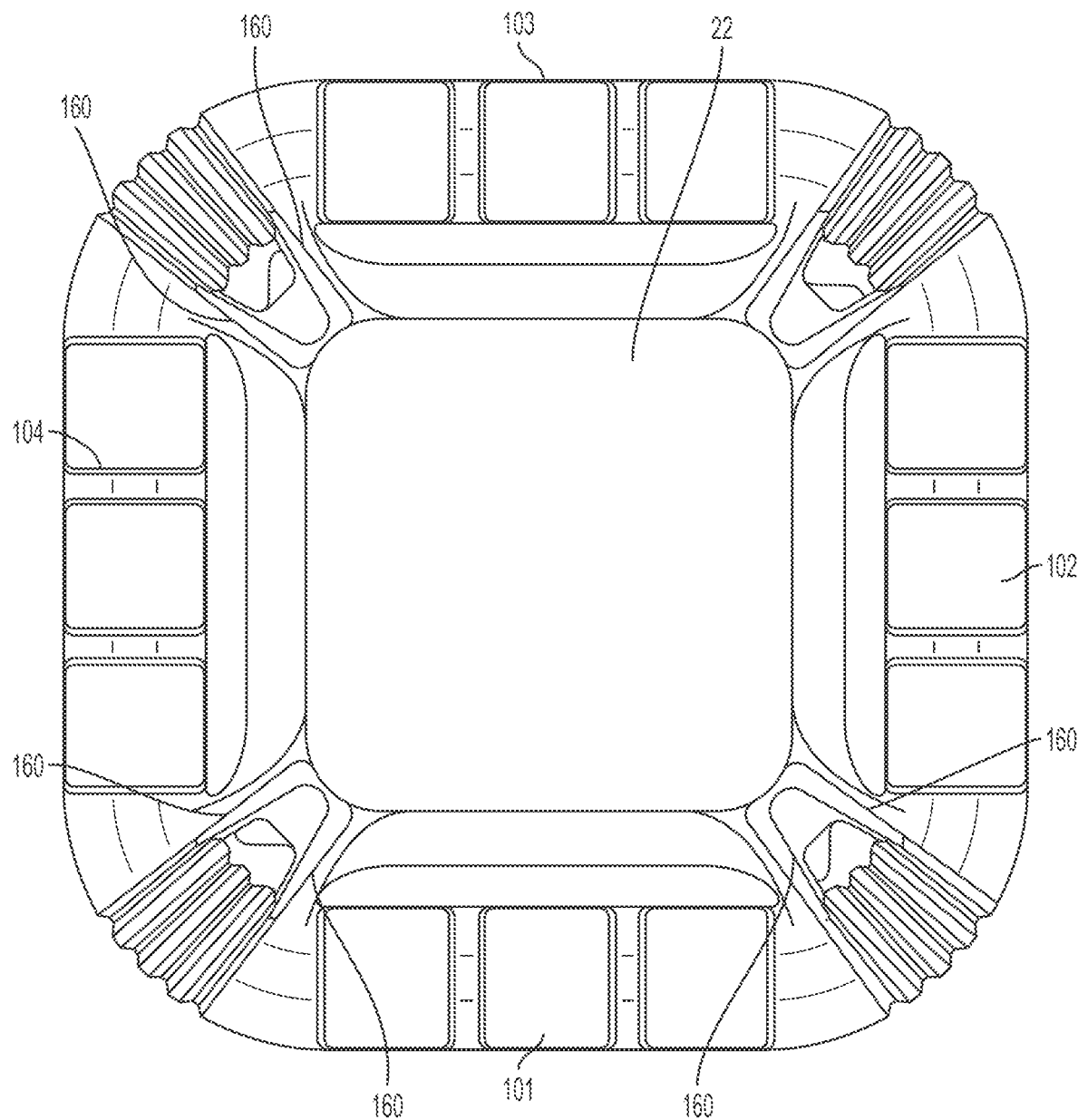
FIG. 8 is a bottom view of the exemplary embodiment of the laser level.
Figure 9:
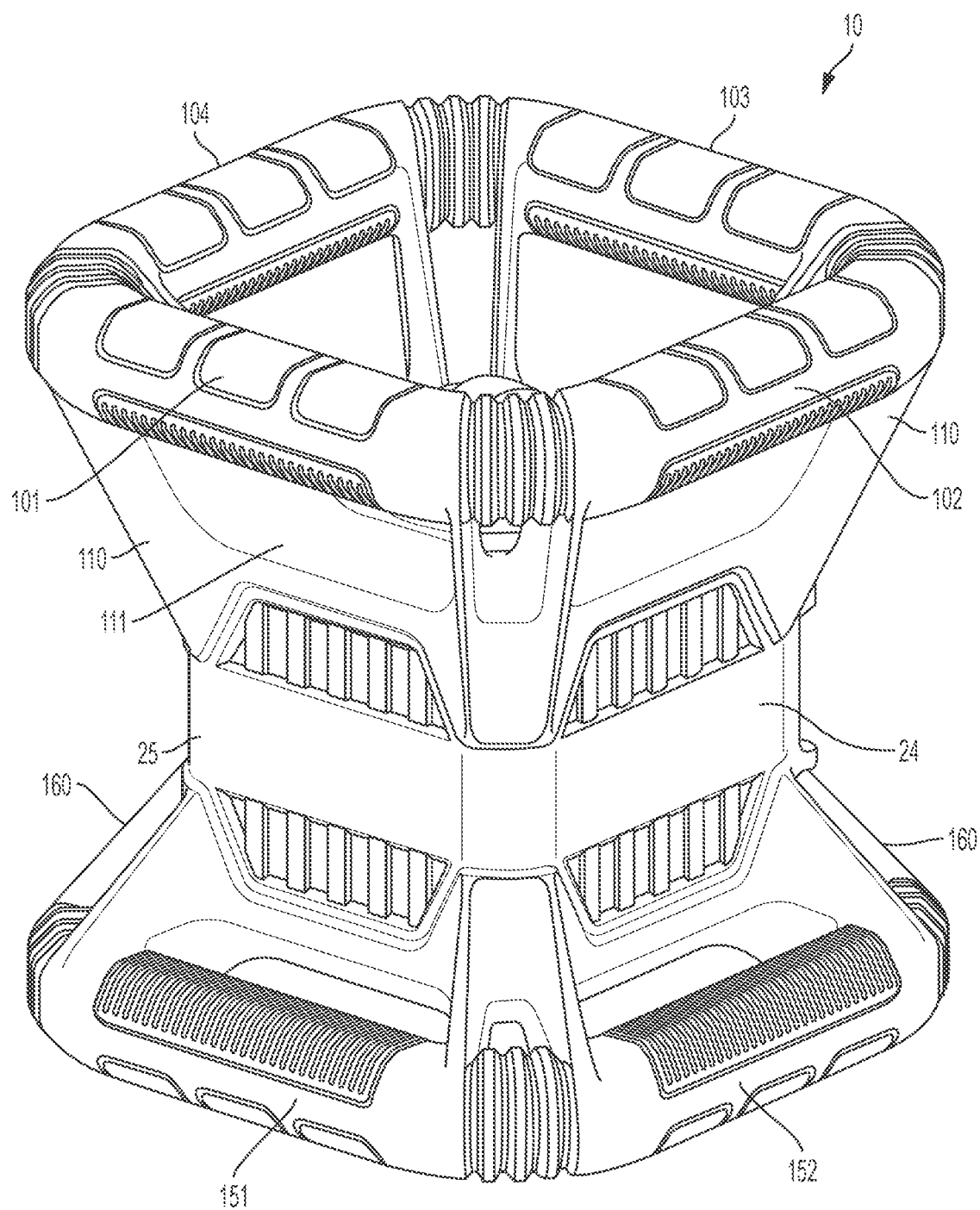
FIG. 9 is perspective view of the exemplary embodiment of the laser level with the battery pack removed.
Figure 10:
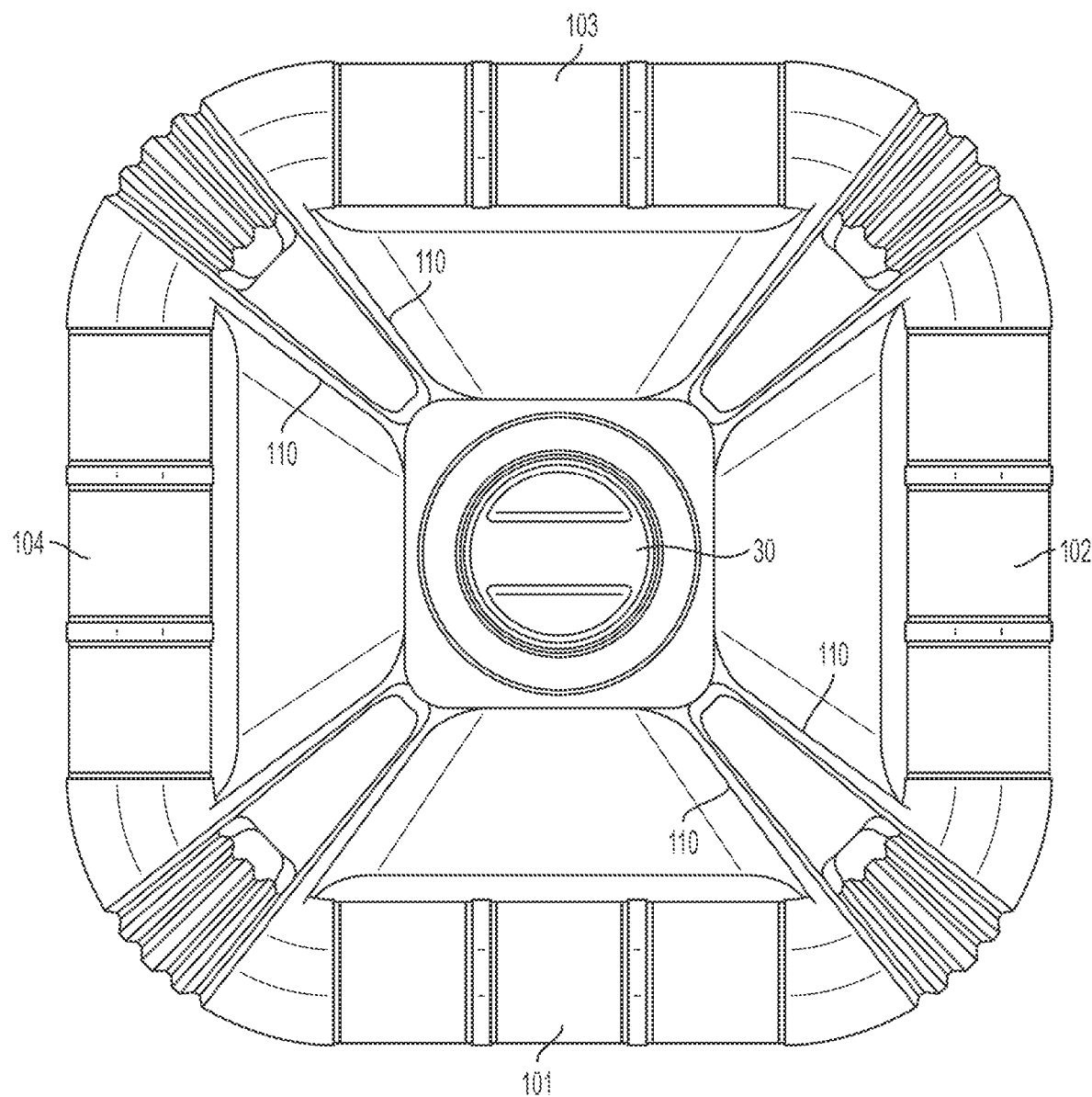
FIG. 10 is a top view of the exemplary embodiment of the laser level with the battery pack removed.

As shown in, for example, FIG. 3, the upper flanges 101, 102, 103, 104 form a closed shape that is generally square. The structure is open inside the closed square shape, allowing access to the laser projector 30. Similarly, as is shown in FIG. 8, the lower flanges 151, 152, 153, 154 form a closed shape that is generally square shape. The structure is open inside the closed square shape, allowing access to the bottom surface 22 of the control mechanism housing 20.

Figure 16:
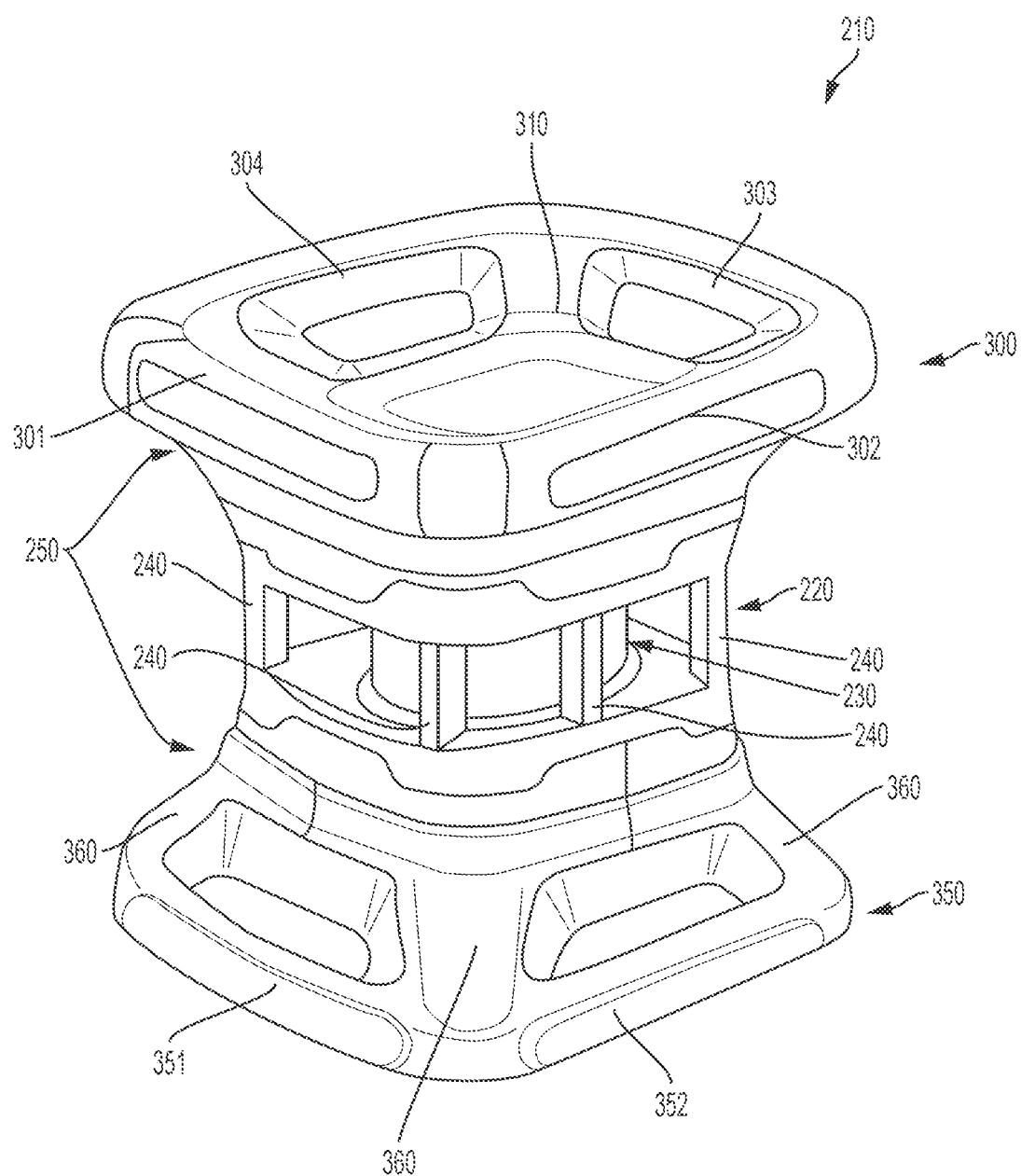
FIG. 16 is an illustration of a laser level according to a second exemplary embodiment.

FIG. 16 shows another exemplary embodiment of a laser level 210. Unless otherwise stated, the features of this exemplary embodiment are the same as in the previous exemplary embodiment. For example, similar materials can be used in this exemplary embodiment and similar laser mechanisms are also possible. In this instance, the laser projector 230 is disposed at a center of a control mechanism housing 220. There is a protective structure 250 which includes an upper protective structure 300 and a lower protective structure 350. The upper protective structure 300 includes flanges 301, 302, 303, 304 which provide a generally square shape. The lower protective structure 350 includes flanges 351, 352 (and two other flanges not shown) which also provide a generally square shape. In this exemplary embodiment, the upper legs 310 include a single leg 310 at each corner of the control mechanism housing 220. As can be appreciated, in this embodiment, laser beams projected by the projector 230 do not have to pass through the upper legs 310. Accordingly, the upper legs 310 can be made thicker without impeding the projection of a laser beam. In this exemplary embodiment, the lower legs 360 also comprise a single leg 360 at each corner.

As shown in FIG. 16, this exemplary embodiment includes support posts 240. The support posts 240 connect portions of the control mechanism housing 220. As can be appreciated, laser beams projected from the laser projector 230 may pass through this section of the housing 220. Accordingly, having relatively thin supports posts 240 lessens the amount of any disruption of a laser beam.

Figure 17:
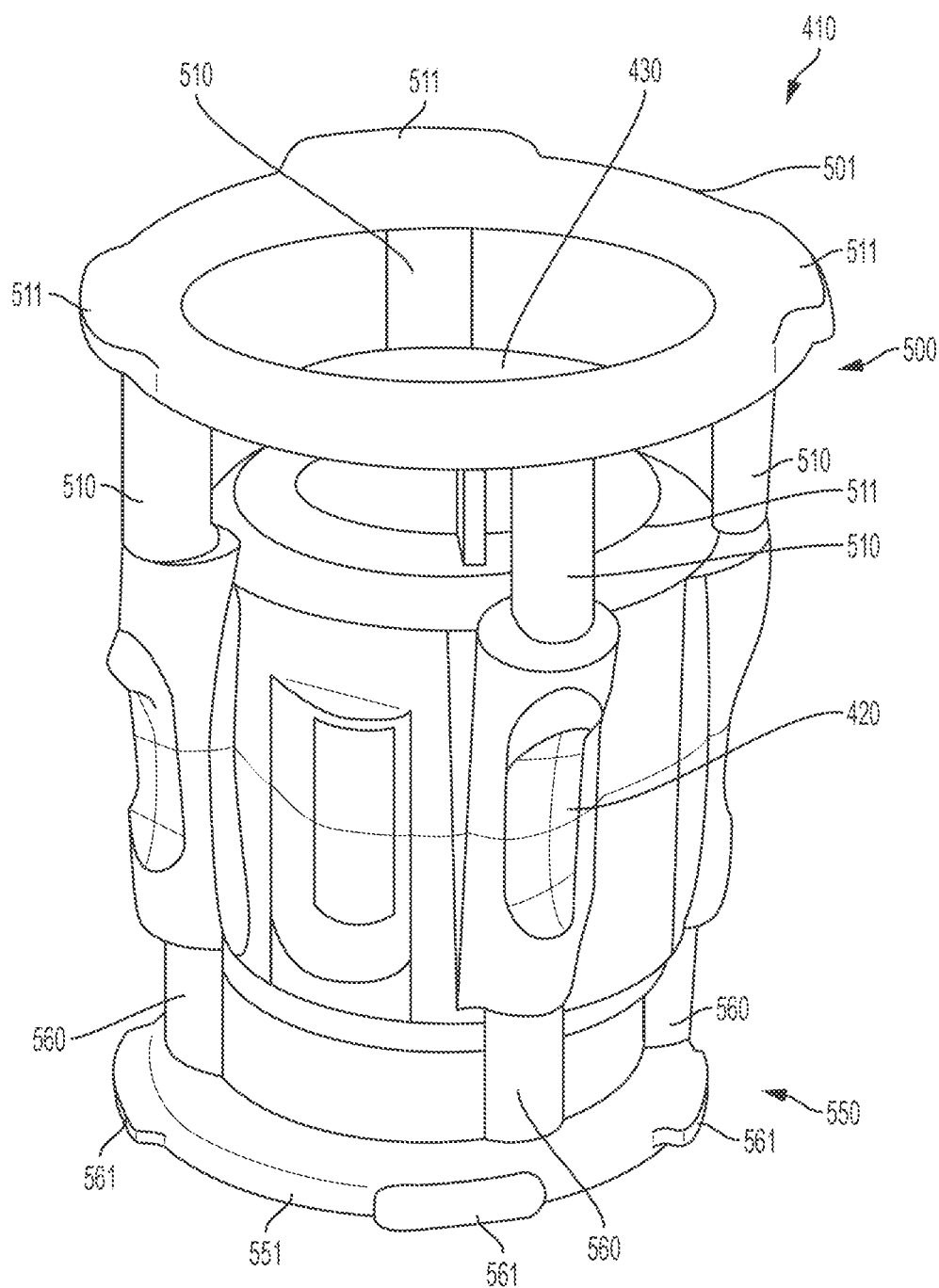
FIG. 17 is an illustration of a laser level according to a third exemplary embodiment.

Another exemplary embodiment of a laser level is shown in FIG. 17. As shown in FIG. 17, the laser level 410 of this exemplary embodiment is generally cylindrically shaped. In particular, the control mechanism housing 420 is roughly cylindrical shaped and the overall laser level 410 is roughly cylindrically shaped. As shown in FIG. 17, the projector 430 in this embodiment is at a top end of the housing 420.

As with the previous embodiments, the laser level 410 of FIG. 17 has a protective structure 450 consisting of an upper protective structure 500 and a lower protective structure 550. The upper protective structure 500 includes a generally circular flange 501 which is supported by four upper legs 510. The flange 510 includes a series of bumpers 511. In the exemplary embodiment, there are four bumpers 511 which are disposed at each of the legs 510. In other embodiments, there may be a greater number of bumpers 511 or fewer bumpers 511.

The lower protective structure 550 likewise includes a generally circular flange 551 which is supported by four lower legs 560. The lower protective structure 550 also includes a series of bumpers 561. The bumpers 511, 561 make it so that if the laser level 410 is placed on its side on a flat surface, the protective structure 450 contacts the flat surface and the control mechanism housing 420 does not. In this exemplary embodiment, because of the shape of the laser level 410, the laser level 410 can be rolled when on its side if pushed by a user. As with other embodiments, it can also be placed upside down. The bumpers 511, 561 also allow it to rest on each of its sides as each bumper will resist further rolling.

In other embodiments, the shape of the laser level could be different. For example, in FIG. 17, the flanges 501, 551 are generally circular and the control mechanism housing 420 is generally cylindrical. The shape could be modified so that the flanges are generally elliptical and the control mechanism housing is a generally elliptical cylinder. The major axis of the elliptical shape can be different in different embodiments.

Figure 18A:
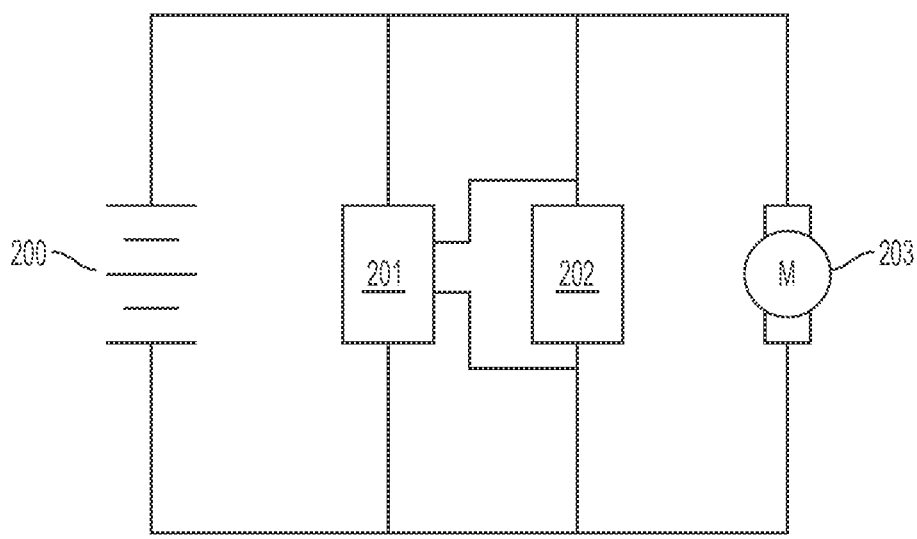
FIG. 18A is a simplified electrical schematic according to an exemplary embodiment.
Figure 18B:
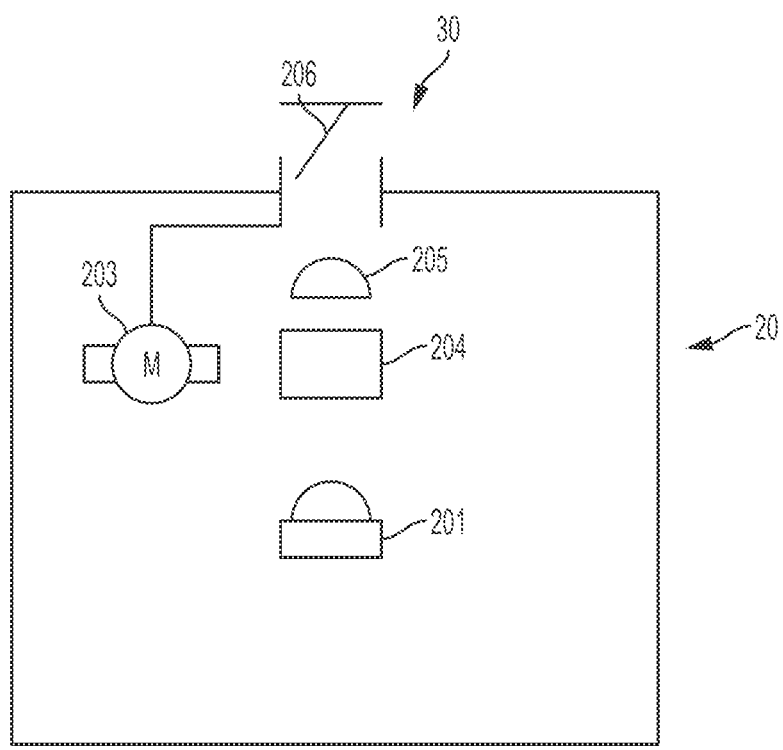
FIG. 18B is a simplified schematic according to an exemplary embodiment.

Simplified schematics for operation of a laser level are shown in FIGS. 18A and 18B. As shown in FIG. 18A, battery pack 200 provides power to a light source 201, a controller 202 and motor 203. The light source 201 may be, for example, a laser diode. The controller 202 may, for example, a microcontroller or microprocessor. As shown in FIG. 18B, there is a light source 201. The light source 201 projects light through a collimator lens 204 and the light then travels through a prism 205 and finally is reflected off of mirror 206 disposed in the projector 30. Motor 203 rotates the projector 30. Alternatively, the motor 203 may rotate the mirror 206 directly. As previously discussed other mechanisms for the laser are possible and part of the present application.

In an exemplary embodiment, the upper protective structure 100 may be made of a material having a Shore A hardness of 40 to 100; 50 to 100; 60 to 100; 70 to 100; 70 to 90; 60 to 90; 50 to 90; 40 to 90 or 40 to 80.

In an exemplary embodiment, the lower protective structure may be made of a material having a Shore A hardness of 40 to 100; 50 to 100; 60 to 100; 70 to 100; 70 to 90; 60 to 90; 50 to 90; 40 to 90 or 40 to 80.

In an exemplary embodiment, the flanges of the upper protective structure may be made of a material having a Shore A hardness of 40 to 100; 50 to 100; 60 to 100; 70 to 100; 70 to 90; 60 to 90; 50 to 90; 40 to 90 or 40 to 80.

In an exemplary embodiment, the flanges of the lower protective structure may be made of a material having a Shore A hardness of 40 to 100; 50 to 100; 60 to 100; 70 to 100; 70 to 90; 60 to 90; 50 to 90; 40 to 90 or 40 to 80.

The legs of the upper protective structure may be made of a material having a higher hardness than the material of the flanges of the upper protective structure. The legs of the upper protective structure may be made of a material having a lower hardness than the material of the flanges of the upper protective structure.

The legs of the lower protective structure may be made of a material having a higher hardness than the material of the flanges of the lower protective structure. The legs of the lower protective structure may be made of a material having a lower hardness than the material of the flanges of the lower protective structure.

In another embodiment, the flanges of the protective structure can form a triangular shape and the control mechanism housing can be generally shaped as a triangular prism. In other embodiments, the flanges could form a shape with more sides such as 5 sides (pentagon), six sides (hexagon), seven sides (heptagon), eight sides (octagon), etc. and the control mechanism housing can be shaped with a corresponding structure (i.e., having a cross-section that corresponds to the shape formed by the flanges).

In other embodiments, the shape formed by the flanges and the control mechanism housing may not correspond. For example, the flanges may form a hexagon shape while the control mechanism housing is generally cube shaped.

Various different features have been shown and described with respect to different embodiments. It is contemplated that the features of the embodiments could be combined or used in other embodiments. For example, a centrally located projector as shown in FIG. 16 could also be used with a cylindrically laser level of the type shown in FIG. 17.

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A laser lever comprising:
   a mechanism housing, the mechanism housing comprising a top, a bottom, a first side between the top and the bottom and a second side between the top and the bottom, the second side opposite the first side;
   a motor in the mechanism housing;
   a controller in the mechanism housing;
   a laser projector at the top of the mechanism housing, the laser projector configured to project a laser beam onto a surface;
   a first protective structure associated with the top of the mechanism housing;
   wherein the first protective structure comprises a first flange at the first side and a second flange at the second side;
   wherein the first flange is generally parallel to the first side;
   wherein the second flange is generally parallel to the second side.

2. The laser level of claim 1, wherein the mechanism housing has a substantially cuboid shape.

3. The laser level of claim 2, wherein the laser level is configured to project a horizontal line when placed upright on a flat surface.

4. The laser level of claim 3, further comprising a battery pack receptacle, the battery pack receptacle configured to receive a removable battery pack for powering the laser level.

5. The laser level of claim 4, wherein the battery pack receptacle is below the laser projector when the laser level is placed upright on a flat surface.

6. The laser level of claim 1, wherein the mechanism housing comprises a first material;
   wherein the first flange and the second flange comprise a second material; and
   wherein the first material is harder than the second material.

7. The laser level of claim 6, wherein the second material is a shock absorbing material.

8. The laser level of claim 1, wherein the first flange and the second flange each comprises a flat.

9. The laser level of claim 1, further comprising a second protective structure associated with the bottom of the control mechanism housing;
   wherein the second protective structure comprises a third flange at the first side and a fourth flange at the second side;
   wherein the first flange is generally parallel to the third flange; and
   wherein the second flange is generally parallel to the fourth flange.

10. The laser level of claim 9, wherein the first flange and the third flange are configured such that when the first flange and the third flange are placed on a flat horizontal surface, the first side of the mechanism housing is spaced from the flat horizontal surface by the first protective structure and the second protective structure.

11. The laser level of claim 9, wherein the first flange and the third flange are configured such that when the first flange and the third flange are placed on a flat horizontal surface, the first side of the mechanism housing is generally parallel to the flat horizontal surface.

12. The laser level of claim 9, wherein the first flange and the third flange are configured such that when the first flange and the third flange are placed on a flat horizontal surface, the laser projector is configured such that it can project a rotary vertical line.

13. A laser lever level comprising:
- a mechanism housing, the mechanism housing comprising a top, a bottom, a first side between the top and the bottom, and a second side between the top and the bottom, the second side opposite the first side;
- a motor in the mechanism housing;
- a controller in the mechanism housing;
- a laser projector at the top of the control mechanism housing, the laser projector configured to project a rotational laser beam about three-hundred and sixty degrees;
- a first protective structure extending from an area about the top of the control mechanism housing;
- a second protective structure extending from an area about the bottom of the control mechanism housing;
- wherein the first protective structure comprises a first flange at the first side and a second flange at the second side;
- wherein the first flange is generally parallel to the first side;
- wherein the second flange is generally parallel to the second side;
- wherein the second protective structure comprises a third flange at the first side; and
- wherein the first flange is generally parallel to the third flange.

14. The laser level of claim 13, further comprising a battery pack receptacle, the battery pack receptacle configured to receive a removable power tool battery pack.

15. The laser level of claim 14, wherein the battery pack receptacle is between the top and the bottom of the mechanism housing.

16. The laser level of claim 15, wherein the first flange and the third flange are configured such that when the first flange and the third flange are placed on a flat horizontal surface, the first side of the mechanism housing is spaced from the flat horizontal surface by the first protective structure and the second protective structure.

17. The laser level of claim 16, wherein the first flange is generally parallel to the second flange.

18. The laser level of claim 17, wherein the first flange, the second flange and the third flange each comprise a flat.

19. A laser lever level comprising:
- a mechanism housing, the mechanism housing comprising a top, a bottom, a first side between the top and the bottom, and a second side between the top and the bottom, the second side opposite the first side;
- a motor in the mechanism housing;
- a controller in the mechanism housing;
- a laser projector at the top of the control mechanism housing, the laser projector configured to project a rotational laser beam about three-hundred and sixty degrees;
- a first protective structure extending from an area about the top of the control mechanism housing;
- a second protective structure extending from an area about the bottom of the control mechanism housing;
- wherein the first protective structure comprises a first flange at the first side and a second flange at the second side;
- wherein the first flange is generally parallel to the first side;
- wherein the second flange is generally parallel to the second side;
- wherein the second protective structure comprises a third flange at the first side;
- wherein the first flange is generally parallel to the third flange;
- wherein the first flange and the third flange are configured such that when the first flange and the third flange are placed on a flat horizontal surface, the first side of the mechanism housing is spaced from the flat horizontal surface by the first protective structure and the second protective structure.

20. The laser level of claim 19, further comprising a battery pack receptacle, the battery pack receptacle configured to receive a removable power tool battery pack; and
- wherein the battery pack receptacle is between the top and the bottom of the mechanism housing.

* * * * *